May 24, 1932.      R. MERCIER      1,860,328
DEVICE FOR ELECTRICALLY LIGHTING SIGNALS
Filed April 22, 1929      3 Sheets-Sheet 1
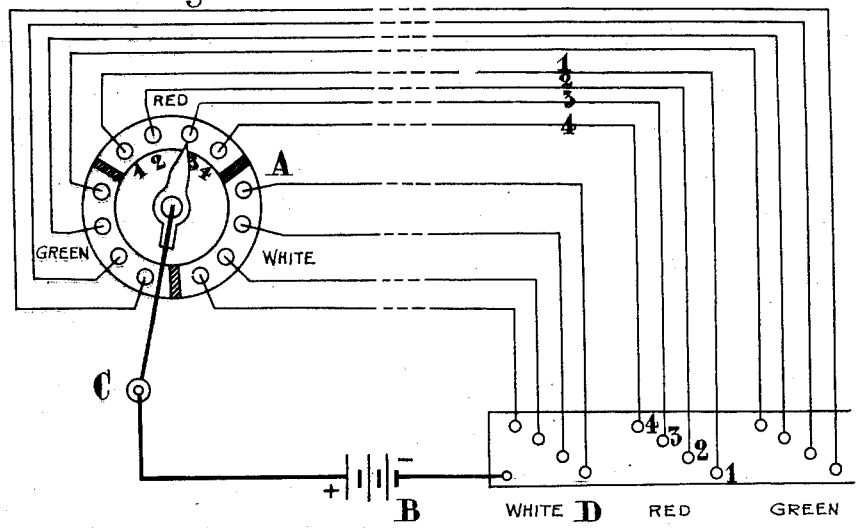
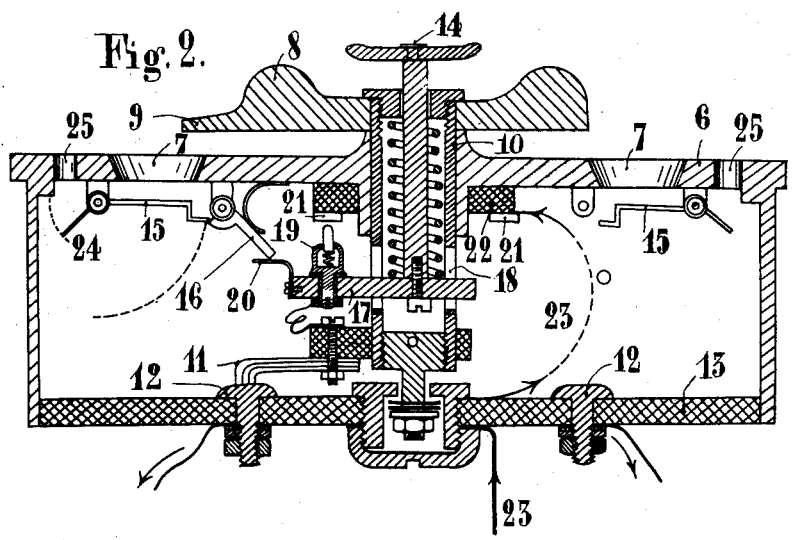
INVENTOR:
René Mercier
BY
ATTORNEY.

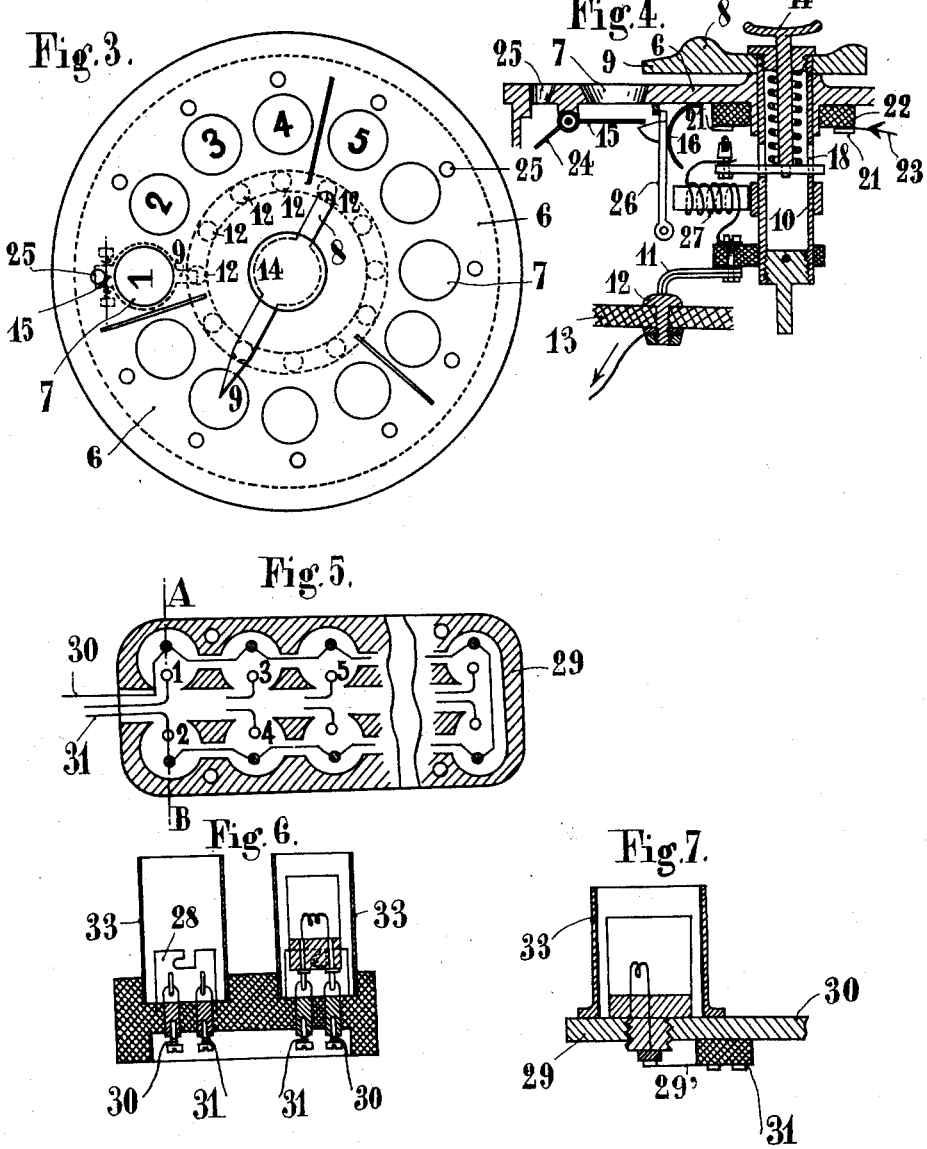

May 24, 1932.　　　R. MERCIER　　　1,860,328
DEVICE FOR ELECTRICALLY LIGHTING SIGNALS
Filed April 22, 1929　　　3 Sheets-Sheet 3

INVENTOR:
René Mercier
BY
ATTORNEY

Patented May 24, 1932

1,860,328

UNITED STATES PATENT OFFICE

RENÉ MERCIER, OF PARIS, FRANCE, ASSIGNOR TO ETABLISSEMENTS AERA, OF PARIS, FRANCE, A CORPORATION OF FRANCE

DEVICE FOR ELECTRICALLY LIGHTING SIGNALS

Application filed April 22, 1929, Serial No. 357,092, and in France May 1, 1928.

Light signals as used in air navigation are generally produced by means of rockets which are fired in a special pistol. Such primitive method requires the use of both hands and a certain amount of care must be exercised for the loading of the pistol; moreover, as there are three colours of lights, viz.: green, red and white, according to the signal to be produced, it is not possible to pre-load the pistol, because any change involves a tedious manipulation.

This invention has for its object an apparatus whereby the use of light signals may be easily controlled, while remedying the above mentioned difficulties.

A possible embodiment of such an apparatus is shown by way of example in the appended drawings.

Figure 8:
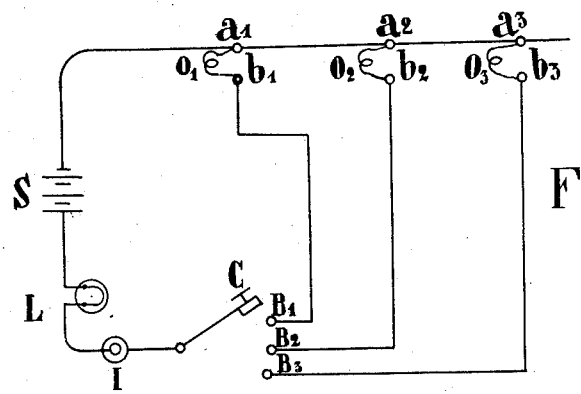
Figure 9:
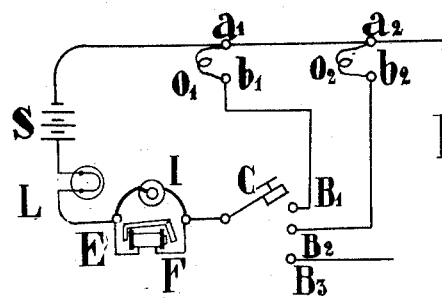
Figure 10:
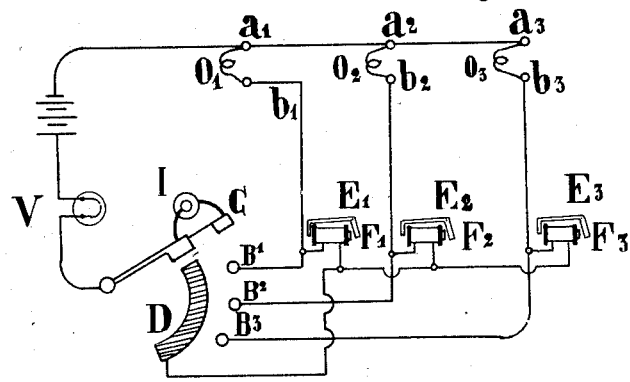

Figure 1 is a diagrammatic general view.
Figures 2, 3 and 4 are details of the firing distributor.
Figures 5, 6 and 7 refer to the rocket holder.
Figures 8, 9 and 10 relate to checking means applicable to the apparatus illustrated in the foregoing figures.

The apparatus comprises essentially a rocket holder D to be positioned at the most convenient place on the aircraft, said holder being electrically connected to a source of current B and to a firing distributor A located within the pilot's reach, according to the general arrangement shown in Figure 1.

The firing distributor shown in detail in Figs. 2, 3 and 4 is made, for instance, in the form of a cylindrical casing provided with a flange or lugs and to match with the remaining instruments on the dash-board. It carries on its front face a dial 6 provided with a number of windows 7 corresponding to that of the rockets to be fired. The windows are distributed in a circle and numbered. Each of them is closed by means of a correspondingly numbered shutter. In order to provide for a better visibility, the shutters may optionally be painted in the colour of the related rockets, same being twelve in number and divided into three groups of four each, viz.: white, red and green.

A central lever 8 provided with a finger or pointer 9 and mounted upon a hollow shaft 10, may be set in front of any one of the windows. The lever is connected to one pole of the source of current and is provided at the lower part thereof with a brush 11 moving over a circular series of contacts 12 carried by the insulating back wall 13 of the casing. Each one of the contacts corresponds to one window of the dial and is electrically connected to the related rocket in the rocket holder.

Current may be sent through the rocket primer by means of a switch C included in the wire leading to the lever 8.

The lay-out may conveniently be simplified by arranging the switch in the lever of the distributor itself, said switch being preferably actuated by means of a pull rod 14 so as to preclude any untimely firing.

Figure 2 shows a detail view of such arrangement.

In their raised positions, shutters 15 appear in their colours and with their numbers on the dial, being held in this position by the spring-loaded finger 16. The pull rod carries a guide 17 adapted to slide in slots 18 formed in the hollow shaft 10 rigid with the lever 8.

Said guide carries a plunger contact 19 which may be insulated and is electrically connected to brush 11, and a spring 20 attached to the extremity thereof. The current supplied by the battery is delivered through suitable wires 23 to a metal ring 21 which is insulated from the other parts of the apparatus by member 22.

The movement of the pull rod 14 closes the firing current circuit through the engagement of contact 19 with ring 21, while finger 16 is set free by the action of spring 20 and the shutter 15 swings down under the action of gravity. At the same time, the tail 24 of the shutter appears in front of a hole 25, this allowing the shutter to be hung up again by means of any suitable rod when the instrument is re-loaded.

The swinging of the shutter into the off position is more reliable, due to the current supplied to the rocket holder where the control of the shutter is effected by the current itself. For that purpose (Fig. 4), the shutter hold-up finger 16 is provided on an armature 26; and an electro-magnet 27 rigid with shaft 10 and energized by the firing current is rotated by lever 8 and stops opposite the armature 26 which, on the current flowing, is attracted, thus causing the shutter to be released.

The independent rocket holder consists of an insulating or non-insulating block or plate 29 of any suitable form which serves as a support for screw or bayonet sockets 28 into which the rockets are fitted wherefore said rockets have their tips suitably arranged for screw or bayonet fittings.

Figs. 5 and 6 show by way of example a form of holder with bayonet sockets; all of which have a common contact which is connected to a wire 30 leading from the source of current; the remaining contacts being connected each through a separate wire 31 to the related contacts in the firing distributor.

The support for the sockets might as well be made of metal, provided the necessary insulation is afforded.

Figure 7 shows in cross sectional view a simple form of holder for screw tipped rockets which are screwed to one single metal block or plate 29 providing a common support and contact, and which bear with the central contacts of their tips upon springs 29' connected to wires 31 leading from the current distributor.

In order to preclude untimely shots, the rockets may be shielded by means of tubes 33, each of which encloses the device for firing and projecting the rocket, and prevents the fire from being accidentally transmitted to the adjacent rockets at the time of the firing.

In the device described above, it may possibly happen that the rocket remains unfired, notwithstanding the current passes through the primer and the shutter falls; likewise, the shutter may happen to accidentally fall, such fall wrongly indicating in both cases that the rocket was fired.

The checking device according to Figs. 8, 9 and 10 avoids the inconvenience mentioned. Its characteristic is based upon the state of the primer. If the latter is burnt or broken, the rocket must be considered as worthless. If it is still present, the assumption is that a misfire has occurred, and another attempt to fire the apparatus will be made.

The arrangement according to Fig. 8 consists in that a lamp or shutter L is connected in series in the circuit between switch I and battery S. $a$ and $b$ designate the rocket contacts and O the primer. As the firing current is switched on, the lamp lights up, or else a shutter is displayed, whenever the circuit is not open, although said current may have released the related shutter. An indication is thus given that the rocket is still there.

The device according to Fig. 9 is a modification of the one last mentioned. Here, the electro-magnet E, which may control either the operation of a shutter F or the lighting of a pilot-lamp, is connected in shunt to the terminals of switch I. When lever C is brought upon any contact $B_1$, $B_2$ or $B_3$, there flows through the electro-magnet and the primer a very weak current, for example, 1/100 of the firing current, so that no firing can ever take place inasmuch as the heat then produced would be 1/10,000 only of the necessary amount, the heat being proportional to the square of the current.

Said current influences the shutter or the pilot-lamp, which indicates that the rocket has remained unfired. The firing is then produced by short-circuiting the electro-magnet through switch I. There is no longer any indication during the contact; however if, on any account, the rocket should happen to remain unfired when a second attempt to effect firing is made, then the annunciator F would again indicate whether the circuit for the primer is ready or not.

Figure 10 shows a generalization of the same arrangement. In each wire leading from the rockets there is interposed the set $E^1$, $E^2$, $E^3$ for the electric control of the shutter or lamp $F^1$, $F^2$ or $F^3$ corresponding to each rocket, and these wires are led to a common point represented in the apparatus by a conducting ring D which is so arranged that, on the lever C engaging said ring, the current is simply switched into all the circuits and that the shutters of the untouched rockets are all displayed, if desired with the colour indications relating to the individual rockets.

A branch circuit leads the current to contacts $B^1$, $B^2$, $B^3$. which relate to the differently coloured rockets, and the firing is produced on any contact by short-circuiting the resistance through the switch I which is connected in shunt between both contacts of the lever.

A main shutter V or a lamp may complete the apparatus, which provides a definite indication that the current is emitted through the primer, this being a check upon the indication given by the falling of the corresponding shutter, but one lasting so long as the switch remains closed.

The last described checking device is a self-supporting one as far as the indication as to the rockets to be fired is concerned, and it may be substituted for the mechanically or electrically controlled shutters contemplated with reference to Figs. 1 to 7; however, as said last-described device is to operate only at the time of firing, it will preferably be associated with the first described device which gives a permanent indication as to the state of loading of the rocket holder.

Having now particularly described and ascertained the nature of my said invention and in what manner the same is to be performed, I declare that what I claim is:—

1. An apparatus for electrically firing rockets from a distance, comprising a holder for the rockets; a source of electric current; a firing distributor having an insulated bottom and a circular series of contact studs mounted therein; a cover for the distributor; an electric firing circuit in which each rocket is connected, said circuit being connected with said current source and also with said studs; a shaft rotatable in said distributor; a setting lever fixed to said shaft and adapted to be moved in front of windows in said cover; an insulating member carried by the shaft; a contact fixed to said member to move therewith over the contact studs; a spring-returned slide mounted in guide slots formed in said shaft to rotate with the latter and to move longitudinally of and relatively to the shaft independently of such rotation; an insulating member secured to said cover; a contact ring fixed to the last-named insulating member and electrically connected with the current source; a contact carried by the slide to engage said ring when the slide is in one position; an electrical connection between the slide-carried contact and the contact carried by the first-named insulating member; tell-tales pivoted beneath said windows; and spring-controlled fingers supporting the tell-tales and releasing them when the slide is actuated.

2. An apparatus for electrically firing rockets from a distance, comprising a holder for the rockets; a source of electric current; a casing having a bottom of insulating material and a circular series of contact studs mounted in said bottom; a cover for said casing; an electric firing circuit in which each rocket is connected, said circuit being connected with said current source and with said studs; a shaft rotatable in said casing; a setting lever fixed to said shaft and adapted to be moved in front of windows formed in said cover; an insulating member carried by said shaft; a contact carried by said member to move over the contact studs; a spring-returned slide mounted in guide slots in said shaft to rotate with the latter and to move longitudinally of and relatively to the shaft independently of such rotation; an insulating member secured to the casing cover; a contact ring fixed to the last-named insulating member and electrically connected with said current source; a contact carried by the slide to engage said ring when the slide is in actuated position; tell-tales pivoted beneath the windows in said cover; pivotally-mounted, spring-controlled fingers for supporting the tell-tales; and a coil electrically connecting the contact carried by the slide with the contact carried by the shaft and acting to attract the adjacent finger when the circuit is closed between the contact ring and the slide-carried contact.

3. An apparatus according to claim 2, in which the casing cover is provided with openings associated with and adjacent to the windows; and in which the tell-tales are provided with extensions that underlie said openings, thereby to enable the tell-tales to be restored to position by inserting a rod through the said openings to act on said extensions.

4. An apparatus for electrically firing rockets from a distance, comprising a holder for the rockets; a source of electric current; an electric firing circuit wherein each rocket is connected; a firing distributor provided with a contact stud for each rocket, said firing circuit being connected to said current source and to said studs; a setting lever; a contact connected thereto and adapted to be moved into engagement with a selected stud; a tell-tale individual to each stud, and in front of which said lever moves; means for closing the circuit through the rocket corresponding to the stud indicated by the lever; means for controlling the tell-tale indicated by said lever; and means for controlling the priming of each rocket.

In testimony whereof I affix my signature.

RENÉ MERCIER.